(12) United States Patent
Gallien et al.

(10) Patent No.: US 11,604,877 B1
(45) Date of Patent: Mar. 14, 2023

(54) NESTED COURSES OF ACTION TO SUPPORT INCIDENT RESPONSE IN AN INFORMATION TECHNOLOGY ENVIRONMENT

(71) Applicant: Splunk Inc., San Francisco, CA (US)

(72) Inventors: Glenn Gallien, San Francisco, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 894 days.

(21) Appl. No.: 16/119,954

(22) Filed: Aug. 31, 2018

(51) Int. Cl.
  G06F 21/50 (2013.01)
  G06F 21/56 (2013.01)
  G06F 21/55 (2013.01)
  H04L 9/40 (2022.01)

(52) U.S. Cl.
  CPC .......... G06F 21/568 (2013.01); G06F 21/554 (2013.01); G06F 21/561 (2013.01); H04L 63/1416 (2013.01); H04L 63/20 (2013.01)

(58) Field of Classification Search
  CPC .... G06F 21/568; G06F 21/561; G06F 21/554; G06F 21/55; G06F 21/552
  See application file for complete search history.

(56) References Cited

U.S. PATENT DOCUMENTS 10,091,230 B1 * 10/2018 Machani ............... H04L 67/306
10,743,046 B1 *  8/2020 Sahni ................. G06Q 30/0643
2005/0086635 A1 *  4/2005 Parikh ...................... G06F 8/34
                                                       717/103
2009/0089869 A1 *  4/2009 Varghese ........... G06Q 20/4014
                                                       726/7
2014/0279829 A1 *  9/2014 Reinart ................... G06F 16/29
                                                       707/602
2015/0365438 A1 * 12/2015 Carver .................... H04L 63/20
                                                       726/1
2017/0365027 A1 * 12/2017 Hein ....................... G06F 16/29
2019/0213016 A1 *  7/2019 Raghunath ............ G06F 9/4411

OTHER PUBLICATIONS

Chris Simmons, "Playbook Series: Creating Nested Playbooks for Responding to Malware Incidents", Dec. 8, 2016, obtaine online from <https://www.splunk.com/en_us/blog/security/playbook-series-creating-nested-playbooks-for-responding-to-malware-incidents.html>, retrieved on Jul. 17, 2021.*

* cited by examiner

*Primary Examiner* — Jeffery L Williams
*Assistant Examiner* — Zhimei Zhu
(74) *Attorney, Agent, or Firm* — Nicholson De Vos Webster & Elliott LLP

(57) ABSTRACT

Described herein are systems and methods for improving incident response in an information technology (IT) environment. In one implementation, an incident service initiates execution of a course of action and identifies a step in the first course of action that determines data in a first format. The incident service further determines a format requirement for a second step in the course of action and translates the data from the first format to the second format in accordance with the format requirement.

17 Claims, 6 Drawing Sheets

NESTED COURSES OF ACTION TO SUPPORT INCIDENT RESPONSE IN AN INFORMATION TECHNOLOGY ENVIRONMENT

TECHNICAL BACKGROUND

Information technology (IT) environments often employ various computing components, both physical and virtual, to provide desired operations. These computing elements may include end user computing devices, host computing devices, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

OVERVIEW

Described herein are improvements to incident response in information technology (IT) environments. In one example, an incident service initiates execution of a course of action and identifies data in a first format from a first step of the course of action. The incident service further translates the data into a second format and processes the data in a second step of the course of action.

DETAILED DESCRIPTION

Figure 1:
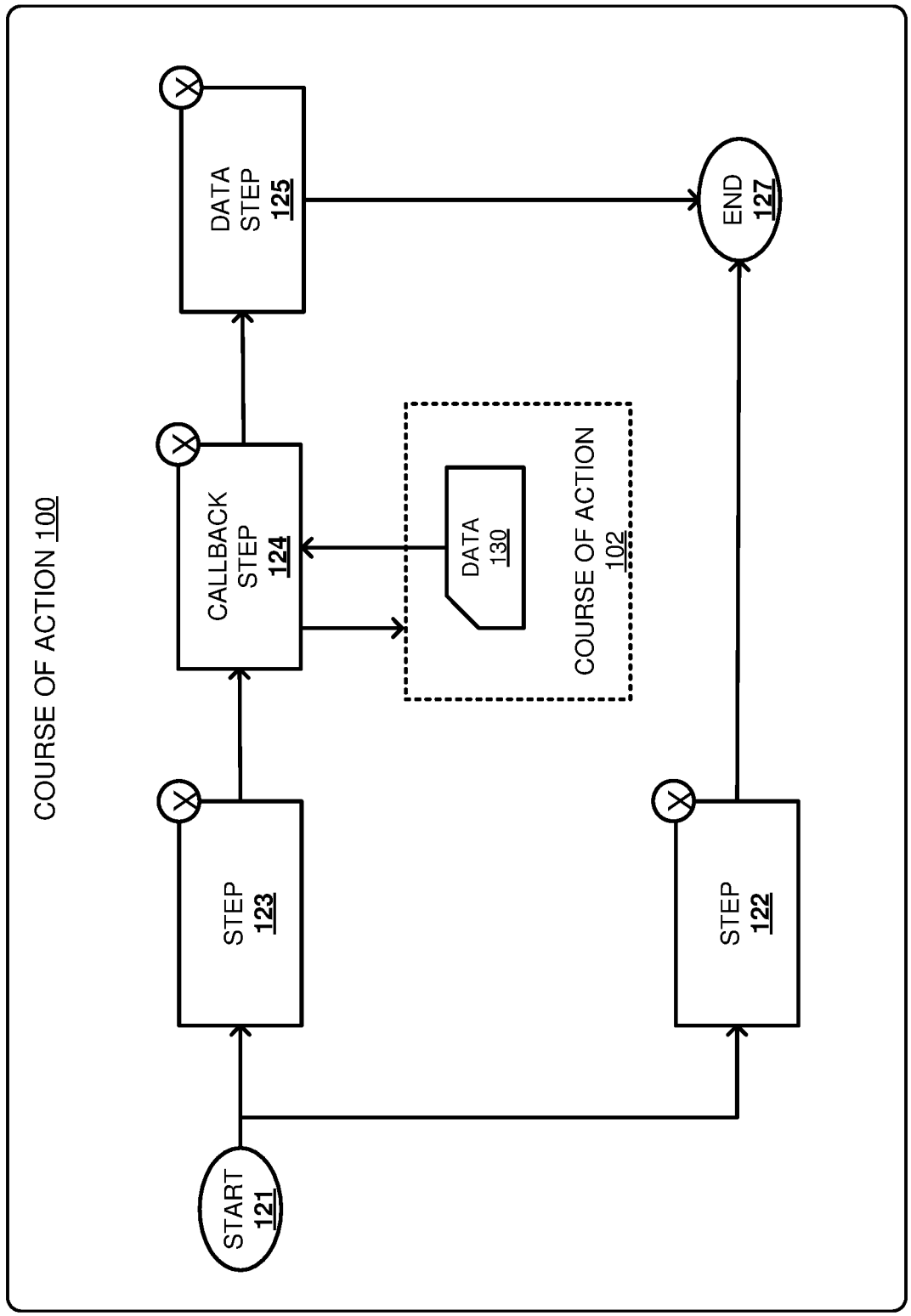
FIG. 1 illustrates a course of action according to an example.

FIG. 1 illustrates a course of action 100 according to an example. Course of action 100 is representative of an action capable of implementation by an incident service. Course of action 100 includes blocks which represent various steps including start 121, steps 122-123, callback step 124, data step 125, and end 127. Also depicted in the example of course of action 100 is course of action 102, which is a nested course of action called by callback step 124 and produces data 130.

In some computing and information technology (IT) environments, incident services may be employed to respond to incidents in the environment. These incidents may include or be associated with viruses, malware, spyware, denial of service attacks, phishing attacks, server crashes, device failures, power outages, or other similar incidents. In some implementations, to identify the incidents, the incident service may implement security information and event management (SIEM) services or monitoring and analytics services that are used to automate the identification of incidents within IT environment. In other implementations, the incident service may be communicatively coupled to a SIEM or other monitoring service, wherein the services may report the incident to the incident service. Further, in some examples, a "ticket" system may be employed, wherein users and analysts of the environment may report incidents. For example, when an email is received from an unknown source seeking personal information, the receiving user of the email may report the email as an incident such that the incident service may process the incident. When reported, the end user may provide information about the incident, however, automated processes may identify additional information for the incident, such as a source domain for the email, specific content or links within the email, or some other similar information that may assist in responding to the incident.

After an incident is identified, a course of action may be determined and executed to respond to the incident, such as course of action 100 depicted in FIG. 1. In some examples, course of action 100 may be implemented automatically when the incident is identified and may be determined based on the incident type, the components in the IT environment affected, any users in the IT environment affected, or some other similar information related to the incident. In other examples, when an incident is identified, an analyst associated with the environment may be required to select a course of action to respond to the incident. Once selected, the course of action may be implemented to respond to the incident.

In defining the courses of action, an analyst may be provided with an interface, wherein the interface permits the addition, removal, and modification of steps in a flow diagram for indicating sequencing of one or more steps. Referring to course of action 100, following start step 121, the course of action implements steps 122 and 123, wherein the steps may comprise steps to obtain additional information about the incident (e.g., geolocation information for internet protocol addresses associated with the incident, domain information for a domain of interest, file reputation information, or some other information related to the incident), steps to modify a configuration of one or more components in the IT environment, steps to monitor communications and operations of components in the environment, decision steps to generate multiple paths in the course of action (e.g., steps to compare data to criteria or steps to determine whether data exceeds a threshold), or some other type of step. Each of the steps in the flow diagram may correspond to instructions capable of implementing the desired course of action, wherein the instructions may be written in one or more formats or languages. As an example, a first step to obtain supplemental information from a service may be written in a first format, while a second step to implement a configuration modification in a component may be written in another format associated with the component.

As depicted in FIG. 1, course of action 100 may include a callback step 124 capable of calling a second course of action comprising one or more additional steps to implement a desired response to an incident. As an example, callback step 124, which follows step 123 includes functionality to call or initiate course of action 102. Once called, course of action 102 may execute in accordance with its one or more steps and provide data 130. Data 130 may comprise supplemental information about an incident obtained from various services, such as geolocation information for internet protocol (IP) addresses, reputation information for addresses, and the like, may comprise information about whether the course of action was successful, may comprise information about assets involved in the incident, or may comprise some other information about the incident or the operations of course of action 102.

Once data 130 is obtained by callback step 124, course of action 100 may execute data step 125, wherein data step 125 may provide various operations based on the data 130. As an example, course of action 102 may provide information about the geolocation of an IP address related to an incident in the IT environment. Once the information is obtained from course of action, data step 125 may then perform a function based on the geolocation data. For example, data step 125 may configure a firewall based on the geolocation information obtained by callback step 124, monitor communications from the IP address based on the geolocation information, or provided any other operation on the data obtained from callback step 124. After data step 125 is performed, course of action 100 may continue to end 127, wherein course of action 100 meets with the second path depicted by step 122.

Figure 2:
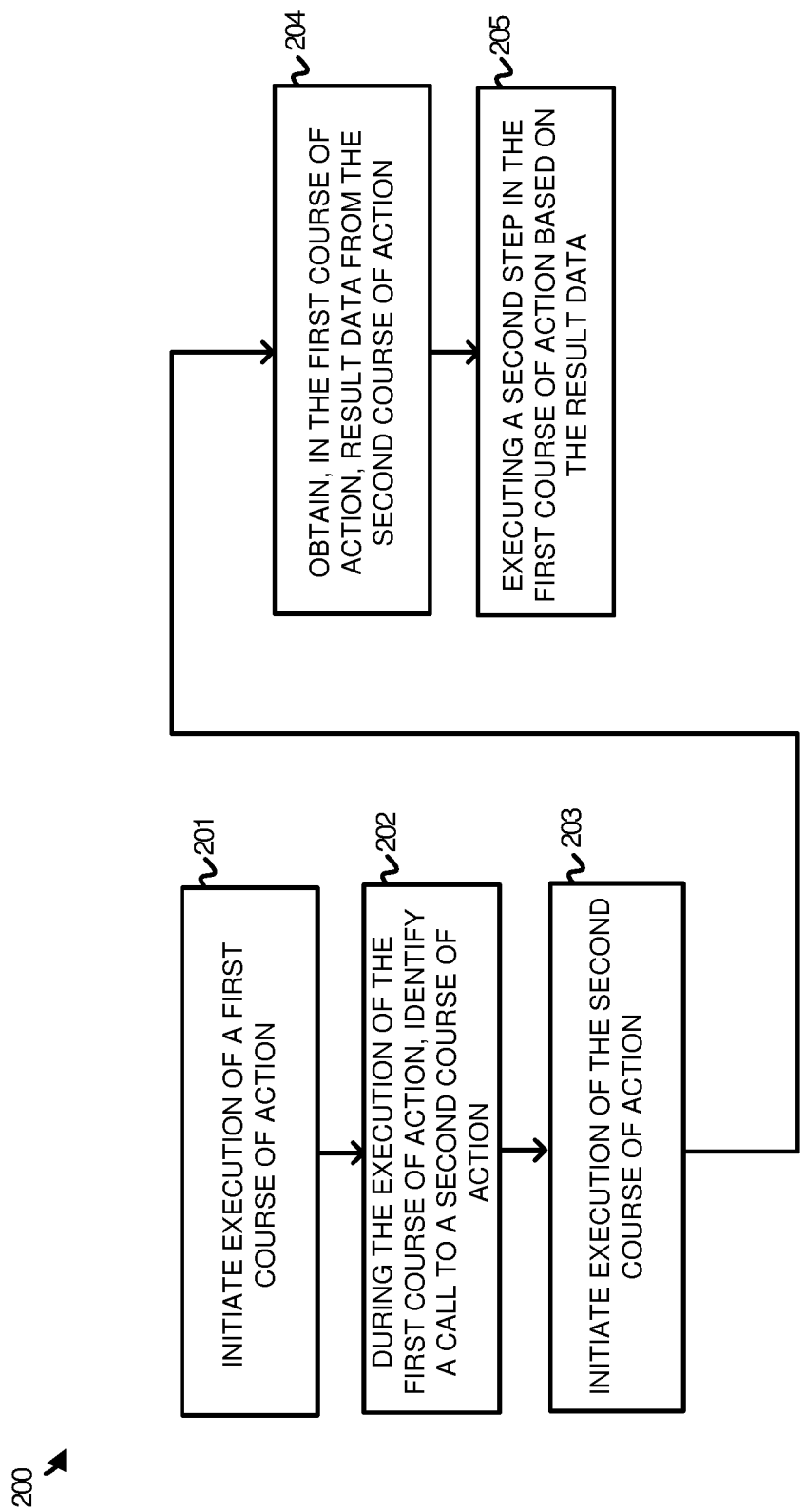
FIG. 2 illustrates an operation of an incident service to implement a course of action according to an example.

FIG. 2 illustrates an operation of an incident service to implement a course of action according to an example. The operations of FIG. 2 are referenced parenthetically in the paragraphs that follow with reference to elements of course of action 100 of FIG. 1.

As depicted in FIG. 2, an incident service initiates (201) execution of a first course of action, wherein the first course of action comprises steps capable of responding to an incident identified in an IT environment. The course of action may comprise an automated course of action capable of execution without user input or may comprise a course of action defined or assigned by a user. Once the course of action is initiated, operation 200 identifies (202) a call to a second course of action, wherein the second course of action may comprise one or more steps to provide various functions with respect to the incident. In some implementations, an incident service may access a database of various courses of action that can assist in responding to incidents in the environment. These courses of action may comprise steps capable of configuring or controlling components in the environment, identifying additional information about an incident, determining additional information about components related to the incident, or provide some other information about an incident. This database may permit courses of action to call or request the execution of other courses of action, limiting the size and complexity of newer courses of action. For example, a course of action that might comprise five steps may be reduced to three steps by using a callback step to call a second course of action that provides the desired functionality.

Once a call is identified to a second course of action, operation 200 may initiate (203) execution of the second course of action, wherein the execution generates result data that can be provided back to the first course of action. This data may comprise supplementary information about attributes of the incident, information about successfulness of the operations from the second course of action, Boolean information, such as identifying whether a query is true or false to the second course of action, or some other similar information. For example, a second course of action may be used to determine whether an IP address associated with an incident originates from a particular country, wherein the IP address may be passed from the first course of action to the second course of action. Consequently, the first course of action may pass the IP address to the second course of action to provide the desired functionality, while the second course of action may indicate TRUE, if the IP address is from the particular country, or FALSE, if the IP address originates from some other location.

As the data is determined by the second course of action, the first course of action obtains (204) the result data from the second course of action and executes (205) a second step in the first course of action based on the result data. The second step may comprise a step to compare the obtained result data to criteria (e.g., determine whether a geographic location meets location criteria), a step to determine whether the result data exceeds or satisfies a threshold (e.g., a file reputation score exceeding a threshold value), a step to modify a component configuration based on the obtained result data, or any other similar step using the obtained data.

In some implementations, the second step may require a different format of the data than the format that was provided from the second course of action. As a result, the incident service may, prior to the execution or as part of the second step, translate or convert the data from a first format to a second format. For example, if the data provided from the second course of action indicated a geographical location in a first format, the incident service may determine a second format required by the second step and convert the geographical location to the second format. Once converted, the geographical location may be processed in accordance with the second step.

In another implementation, rather than translating or converting the data obtained from the second course of action to a second format, the second step may include multiple instruction set versions to process the incoming data. Referring to course of action 100, when data 130 is obtained from course of action 102 as part of callback step 124, the incident service may determine a format associated with the returned data. Once identified, the incident service may determine an instruction set from the various instruction set versions associated with data step 125 to process the data. For example, a geolocation provided in a first format may be processed by data step 125 in accordance with a first instruction set, while a geolocation provided in a second format may be processed by data step 125 in accordance with a second instruction set.

In some examples, callback step 124 may include a flag, instruction, or some other similar identifier to cause the flow associated with callback step 124 to halt or pause operation until data 130 is provided in response to the execution of course of action 102. Once returned, the flow or sequence may continue to data step 125. Further, while demonstrated with a single nested course of action in course of action 102, it should be understood that multiple nested courses of action may be used in course of action 100. These courses of action may be called by steps in course of action 100 or may be called by steps in course of action 102. In some implementations, the nested courses of action may be executed by the same computing system or systems as course of action 100, however, the nested courses of action may be executed wholly or partially on separate computing systems in some implementations.

Figure illustrates an example system 300 to provide improved incident response for an IT environment. System 300 includes analyst systems 310-314, analysts 360-364, incident service 320, IT environment 330, and course of action database 350. IT environment 330 further includes components 340-343 wherein components 340-343 may comprise physical computing systems, virtual computing systems, routers, switches, firewalls, or some other similar types of computing elements, including combinations thereof.

In operation, incident service 320 provides a platform that permits analysts 360-364 to respond to incidents that occur in the IT environment. To respond to the incidents, incident service 320 may manage courses of action that each include one or more steps to respond to various incident types. For example, a power outage may correspond to a first course of action, while a second course of action may correspond to an unknown process executing on a component of IT environment 330. In generating the courses of action, incident service 320 may provide or generate an interface that permits analysts via analyst systems 310-314 to indicate a flow diagram of steps desired to respond to a particular incident. For example, a course of action may be generated by analyst 364 that direct incident service 320 to, in response to an unknown communication for a component of network 130, determine a geolocation of the source of the communication and configure a firewall based on whether communication originated from a particular geolocation. Thus, a first step in the course of action may determine the geolocation of the communication, a second step may determine whether the location meets criteria, and a third step may configure a firewall when the location meets the criteria.

In the example of system 300, course of action database 350 may store, and incident service 320 may access, previously generated courses of action. In some implementations, as courses of action are generated, the courses of action may be stored in course of action database 350. Once stored, the courses of action may be accessed and executed to respond to incidents and may further be used to supplement other courses of action. In some examples, when a new course of action is generated either by an analyst in system 300 or from an external source, rather than replicating steps that correspond to another course of action, the new course of action may use a call back step to invoke the execution of the previously generated course of action. The previously generated course of action may generate data that can be provided to the call back step to be used by other steps in the first course of action.

In some implementations, in calling the second course of action from the first course of action, attributes of the incident may be passed to the second course of action from the first course of action. These attributes may comprise addressing attributes (e.g., IP addresses, domain names, and the like), may comprise process names or file extensions, or may comprise some other similar information about the incident. Further, in some examples, upon the execution of the second course of action, the second course of action may return data based on the incident attributes, which can be processed by later steps in the first course of action.

Figure 3:
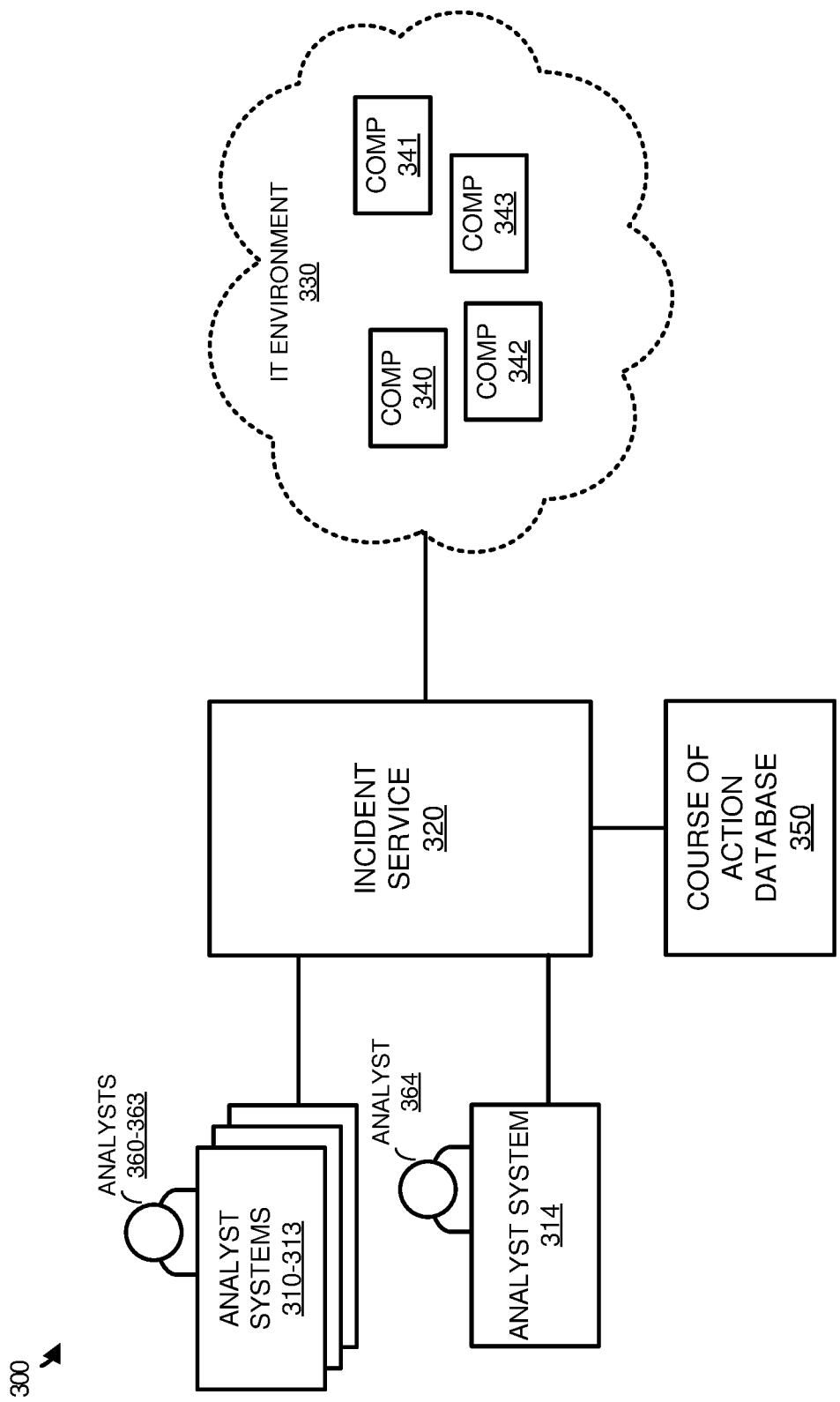
FIG. 3 illustrates an example system to provide improved incident response for an information technology (IT) environment.

Returning to the elements of FIG. 3, analyst systems 310-314, incident service 320, and course of action database 350 may each comprise communication interfaces, network interfaces, processing systems, computer systems, microprocessors, storage systems, storage media, or some other processing devices or software systems, and can be distributed among multiple devices. Examples of analyst systems 310-314, incident service 320, and course of action database 350 can include software such as an operating system, logs, databases, utilities, drivers, networking software, and other software stored on a computer-readable medium. Analyst systems 310-314, incident service 320, and course of action database 350 may comprise, in some examples, one or more server computing systems, desktop computing systems, laptop computing systems, or any other computing system, including combinations thereof.

IT environment 330 includes computing components 340-343, which may include physical computing systems (e.g., host computing systems, user devices, and the like), virtual computing systems, such as virtual machines and containers, routers, switches, and other similar computing systems.

Communication between analyst systems 310-314, incident service 320, course of action database 350, and components within network 130 may use metal, glass, optical, air, space, or some other material as the transport media. Communication between analyst systems 310-314, incident service 320, course of action database 350, and components within network 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between analyst systems 310-314, incident service 320, course of action database 350, and components within network 130 may use direct links or can include intermediate networks, systems, or devices, and can include a logical network link transported over multiple physical links.

Figure 4:
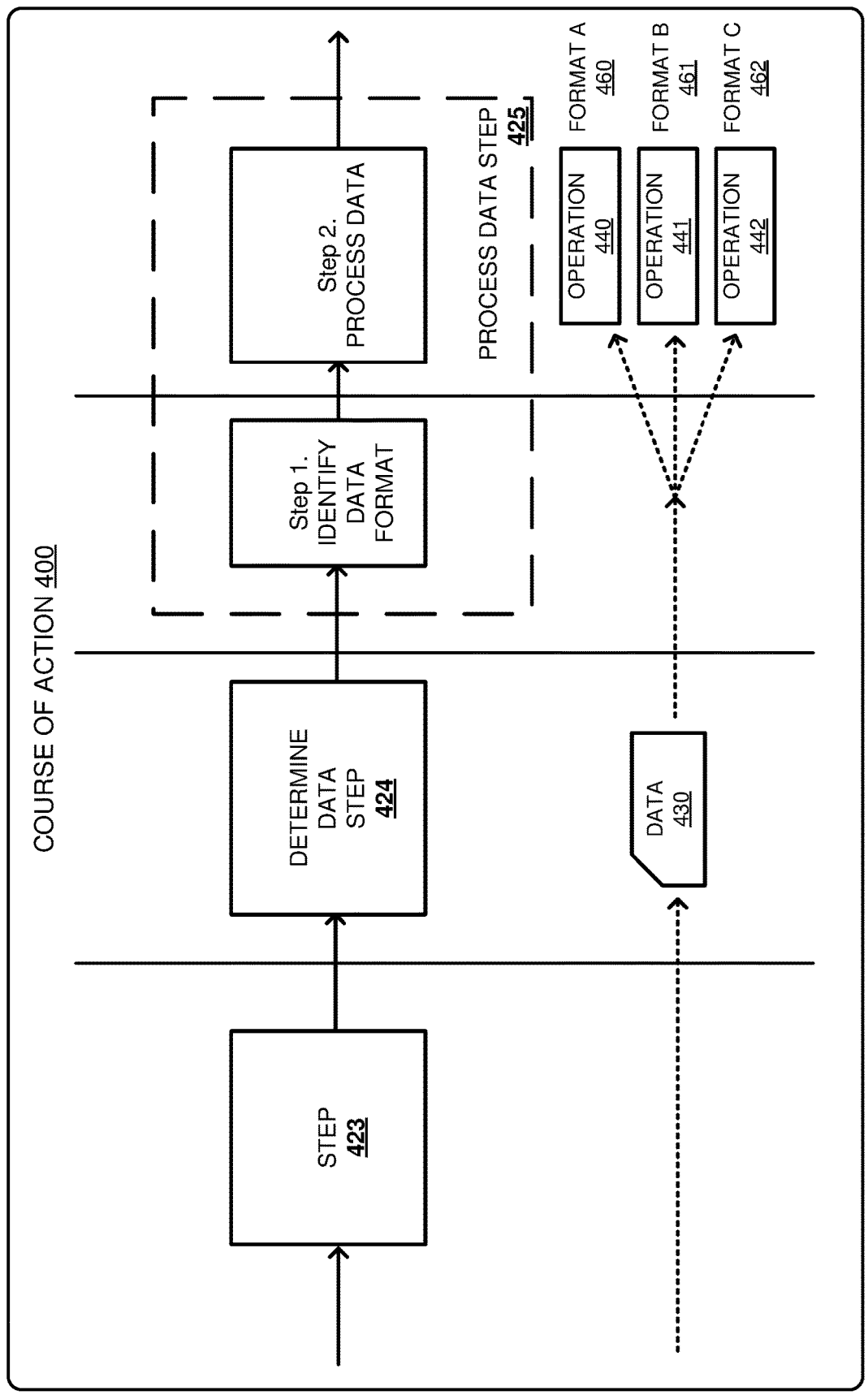
FIG. 4 illustrates an operational scenario of processing data in a course of action according to an example.

FIG. 4 illustrates an operational scenario of processing data in a course of action according to an example. The operational scenario of FIG. 4 includes a course of action 400, with actions 423-425 and data 430.

In an operation of an incident service for an IT environment, the incident service may initiate course of action 400 to respond to an incident associated with an IT environment. Course of action 400 includes a sequence of steps 423-425, wherein each of the steps may determine supplemental information for the incident, may implement configuration modifications in the IT environment, may determine a path for the course of action, or may provide any other similar operation with respect to responding to an incident. In the present implementation, course of action 400 executes step 423. After executing step 423, determine data step 424 is executed, wherein step 424 identifies or determines data 430 related to the incident. The data may correspond to geographic location information for IP addresses or domains, reputation information for files or domains, success information related to the step, or some other similar data, including combinations thereof. In some implementations, step 424 may correspond to instructions, such as programming language instructions, capable of identifying data 430. In other implementations, step 424 may comprise instructions to call a separate course of action to determine data 430. As described herein, an incident service may maintain or access a database, wherein the database comprises courses of action available for use by other courses of action. As a result, when a new course of action is generated, the new course of action may include callback steps to initiate the execution of the second course of action. In executing the second course of action, one or more attributes of the incident may be provided to the second course of action, and the second course of action may generate data 430 to be provided back to the first course of action.

Once data 430 is identified in course of action 400 using step 424, course of action 400 continues to step 425, wherein step 425 includes separate steps for handling data 430. In the present implementation, process data step 425 identifies, at step 1, a data format associated with data 430. As an example, data 430 provided from step 424 may be provided in a first format, while other steps may provide similar data in a different format. For example, different services for geolocation information may provide the geolocation information with different units (e.g., country as opposed to longitude and latitude), may provide the geolocation information with different levels of accuracy (e.g., state over country), or may provide the data in any other different format. As a result, the incident service may determine the format for data 430 and process the data in accordance with the format. Here, process data step 425 includes operations 440-442 that are used to process the data in accordance with formats 460-462. These different operations may correspond to different program instructions or processing instructions capable of processing data that corresponds to the defined format. Thus, once a data format is identified for data 430, the data may be processed by one of operations 440-442.

As an example, data 430 may correspond to geographic location information for an IP address related to the incident, wherein the geographic location information may be provided in the form of a country code. Once the geographic location information is obtained, process data step 425 may determine a format for data 430 and select an appropriate operation of operations 440-442. Accordingly, if country codes correspond to format B 461, then the data may be processed using operation 441 and the corresponding instructions. In determining the format of the data, process data step 425 may identify units associated with data, identify the step associated with generating the data, identify metadata associated with the data, or may identify any other similar trait of the data to determine the data format.

Although demonstrated in the example of course of action 400 as identifying the format of the data as part of process data step 425, the incident service may provide the format determination operations separately from the steps of the course of action. As part of implementing course of action 400, the incident service may determine the types of data formats identified or used in the course of action and determine how the data should be processed in subsequent steps. Further, while demonstrated in the example of course of action 400 as having operations 440-442 operating separately, at least a portion of process data step 425 may include the same instructions independent of the data formats provided to the step.

In some implementations, determine data step 424 may include a flag, an identifier, or some other similar notification capable of halting or pausing the execution of course of action 400 until data 430 is identified by step 424. Without the halt notification, determine data step 424 may continue to step 425 without obtaining the proper data for the execution of step 425. However, with the halt notification, course of action 400 may pause until data 430 is determined by step 424 and pass the required data to subsequent process data step 425.

Figure 5:
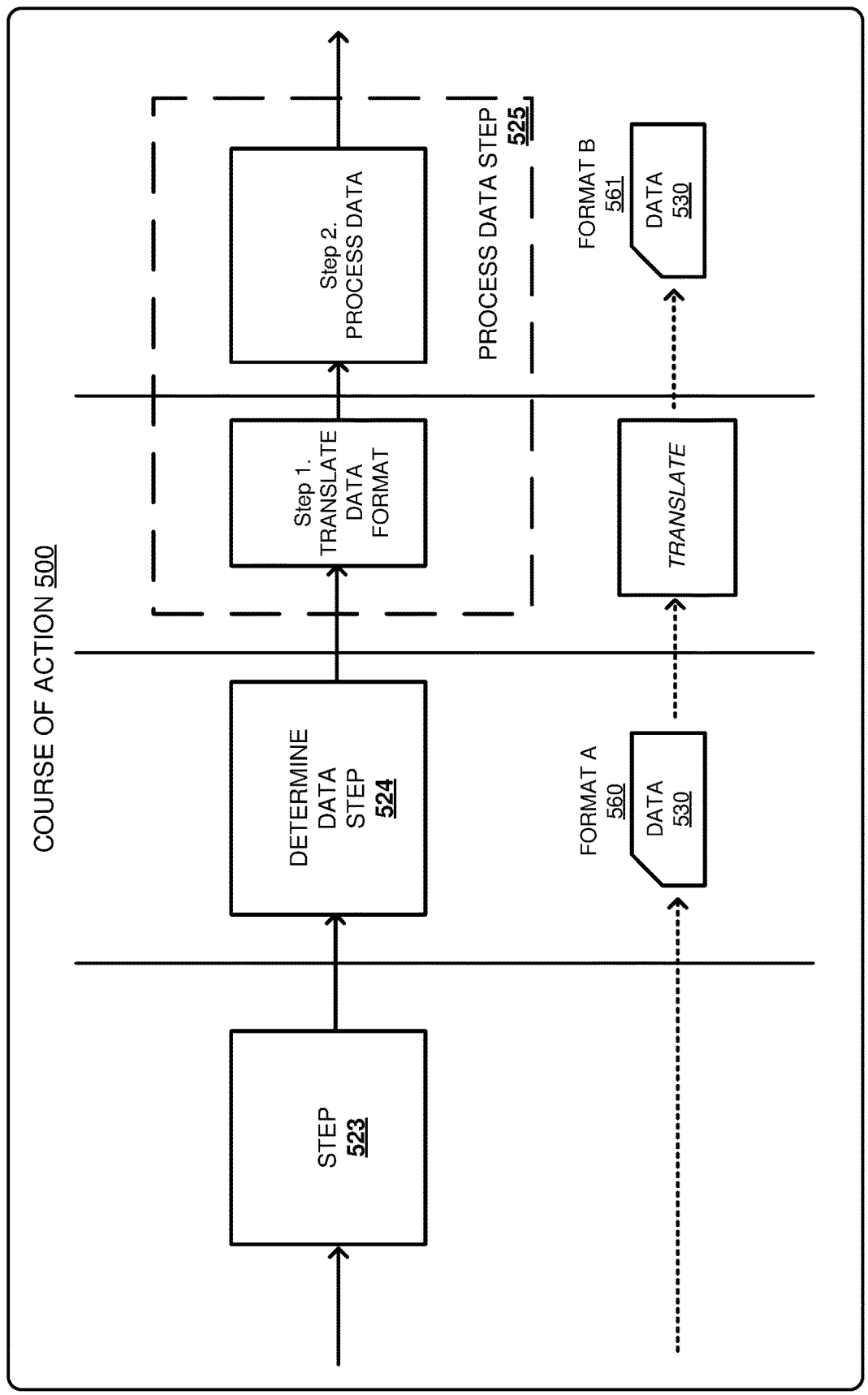
FIG. 5 illustrates an operational scenario of processing data in a course of action according to an example.

FIG. 5 illustrates an operational scenario of processing data in a course of action according to an example. The operational scenario of FIG. 5 includes a course of action 500, with steps 523-525 and data 530.

In an operation of an incident service for an IT environment, the incident service may initiate course of action 500 to respond to an incident in the environment. Course of action 500 includes a flow or sequence of steps 523-525, wherein each of the steps may determine supplemental information for the incident, may implement configuration modifications in the IT environment, may determine a path for the course of action, or may provide any other similar operation with respect to responding to an incident. In the present implementation, step 523 is executed that is followed by determine data step 524, wherein step 524 identifies or determines data 530 related to the incident. The data may correspond to geographic location information for IP addresses or domains, reputation information for files or domains, success information related to the step, or some other similar data, including combinations thereof. In some implementations, step 524 may correspond to instructions (such as programming language instructions) capable of identifying data 530. In other implementations, step 524 may comprise instructions to call a separate course of action to determine data 530. As described herein, an incident service may maintain or access a database, wherein the database comprises courses of action available for use by other courses of action. As a result, when a new course of action is generated, the new course of action may include callback steps to initiate the execution of the second course of action. In executing the second course of action, one or more attributes of the incident may be provided to the second course of action, and the second course of action may generate data 530 to be provided back to the first course of action.

Once data 530 is identified in course of action 500 using action 524, process data step 525 is implemented to process data 530 in format 560. In the example of course of action 500, process data step 525 translates, at step 1, data 530 from format A 560 to format B 561, which is capable of processing by step 525. In translating the data, step 525 may identify a format that is provided from the prior step, determine a format that is required by the current step 525, and translate the data from the first format to the second format. As an example, if data 530 corresponded to geographical coordinates, but step 525 required data in the format corresponding to a country code, the data may be translated from the geographical coordinates to the country code format. This translation may include one or more data structures, tables, linked lists, or some other data structure capable of translating the data from a first format to a second format. In some implementations, in addition to or in place of data structures, the translate operation may use instructions capable of implementing formulas or some other type of algorithm to change format A 560 to format B 561. Once translated, the step 525 processes the data at step 2. This process operation may determine whether to implement a modification in the environment, whether the incident should be considered malicious, the type of modification to the environment, or some other similar operation based on data 530.

Although demonstrated in the example of course of action 500 as identifying the format of the data as part of process data step 525, the incident service may provide the format determination operations separately from the steps of the course of action. As part of implementing course of action 500, the incident service may determine the types of data formats identified in the course of action and determine how the data should be processed in subsequent operations. Further, while demonstrated in the example of course of action 500 as having operations 540-542 operating separately, at least a portion of process data step 525 may include the same instructions independent of the data formats of the input data for the step.

In some implementations, determine data step 524 may include a flag, an identifier, or some other similar notification capable of halting or pausing the execution of course of action 500 until data 530 is identified by step 524. Without the halt notification, determine data step 524 may continue to step 525 without obtaining the proper data for the execution of step 525. However, with the halt notification, course of action 500 may pause until data 530 is determined by step 524 and pass the required data to subsequent process data step 525.

Although demonstrated in FIGS. 1-5 as using blocks for each of the steps in the course of action, an analyst may define a course of action using a variety of shape elements. Further, while a course of action may be implemented using a flow diagram indicative of sequencing of the one or more steps, a course of action may be defined using programming instructions, wherein the instructions are used to invoke each of the steps of the course of action.

Figure 6:
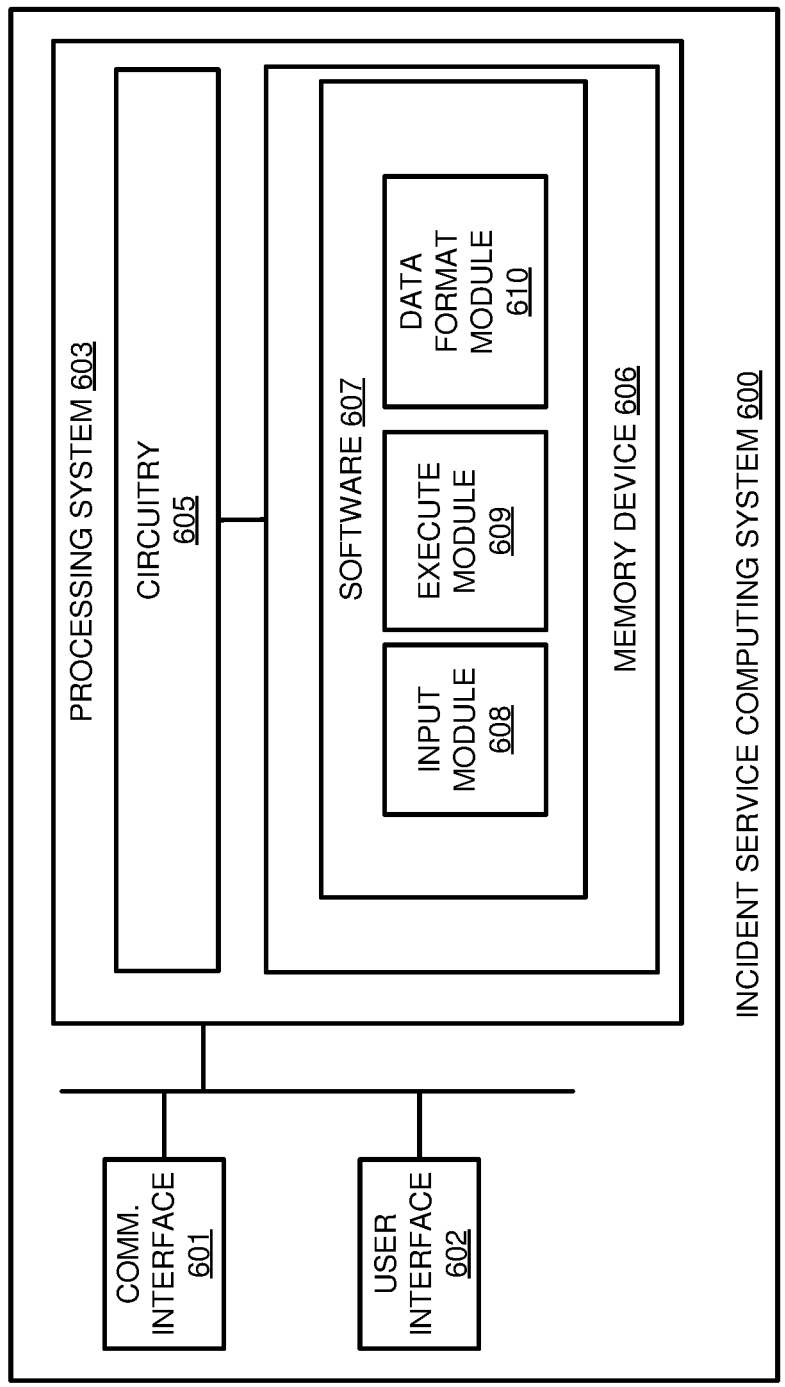
FIG. 6 illustrates an incident service computing system to implement courses of action according to an example.

FIG. 6 illustrates an incident service computing system according to an implementation. Computing system 600 is representative of any computing system or systems with which the various operational architectures, processes, scenarios, and sequences disclosed herein for an incident service may be implemented. Computing system 600 is an example of incident service 320, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate analyst consoles or systems as well as computing components within an IT environment. In some implementations communication interface 601 may further communicate with databases or other services that maintain information about courses of action for the IT environment.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes input module 608, execute module 609, and data format module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, input module 608 directs processing system 603 to obtain input to generate a course of action to respond to incidents in an IT environment. This input may comprise a flow diagram indicating a flow of steps to be implemented as part of the course of action, wherein each step in the flow diagram corresponds to instructions (programming or processing instructions written in one or more programming languages) to implement the desired response. Once a course of action is generated by an analyst, the course of action may be implemented in the IT environment to support the response to an incident and, in some examples, may be stored in a database where analysts may select the course of action to respond to future incidents.

In one example, execute module 609 may initiate execution of a course of action to respond to an incident identified in the IT environment. Execute module 609 may initiate the execution of the course of action automatically when an incident is identified in the IT environment or may initiate execution of the course of action in response to an analyst selecting the course of action for execution. Once initiated, execute module 609 may identify a first step in the course of action that generates or determines data for operations by a second step in the course of action. In some implementations, the first step may comprise a callback step that is used to call a second course of action, wherein the second course of action may return one or more data values capable of use by later steps in the first course of action. The data determined or identified by the first step may comprise geographic location information related to addresses for the incident, may comprise reputation information related to files and addresses corresponding to the incident, may comprise status information for steps that modify parameters or configurations in components of the environment, or may comprise some other similar data. Once the data is obtained from the first step, the second step may process the data as required. In some examples, the second step may comprise instructions capable of processing data in a variety of formats. As an example, geolocations related to IP addresses for an incident may be provided in a variety of formats. As a result, data format module 610 may direct processing system 603 to identify a data format associated with the data from the first step and determine instructions in the second step that correspond to the data format. In this manner, multiple steps may flow to a second step despite differences in the format from the multiple steps.

In some implementations, rather than using multiple instruction sets to handle different formats for the data, data format module 610 may determine a format requirement for the second step and translate the format of the data, if required, to the format required by the second step. As an example, a first step may generate a geolocation for a source IP that corresponds to a first format, while the second step may determine configuration changes to components in the IT environment using a second format for the geolocation. To support the operation of the second step, data format module 610 may use algorithms or data structures to convert or translate the data in the first format to the second format required by the second step. Using the geolocation example, the first format may comprise coordinates associated with an IP address, while the second format may comprise country codes associated with the IP address. Thus, data format module 610 may translate the coordinates generated from the first step to the country code associated with the coordinates for the second step. Once translated, the second step may perform the required steps using the country code. In some implementations, data format module 610 may operate as part of the steps in the course of action, however, data format module 610 may operate separately from the steps. As an example, data format module 610 may determine the various input format requirements of the steps in the course of action, determine the existing data formats that are available for the incident or obtained through other steps in the course of action, and determine any translations that are required to implement each of the steps.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   receiving, via a graphical user interface provided by an incident service, input defining a first course of action, wherein the first course of action includes a first plurality of steps to respond to incidents occurring in information technology (IT) environments, wherein the input defines a graphical diagram indicative of sequencing for the first plurality of steps, wherein a particular step of the first plurality of steps in the graphical diagram represents a call to a second course of action, and wherein the second course of action includes a second plurality of steps to obtain, from an external service, supplemental information about incidents occurring in IT environments;
   storing data defining the first course of action in a course of action database managed by the incident service, wherein the course of action database stores data defining a plurality of courses of action including the first course of action and the second course of action;
   initiating execution of the first course of action, wherein the first course of action is executed to respond to an incident occurring in an IT environment, and wherein the first course of action involves modifying a configuration of a component of the IT environment;
   during the execution of the first course of action:
      identifying the particular step in the first plurality of steps representing the call to the second course of action,
      obtaining the data defining the second course of action from the course of action database managed by the incident service,
      initiating execution of the second course of action,
      obtaining result data from the execution of the second course of action,
      identifying a first format of the result data,
      determining that a second step in the first plurality of steps uses as input result data in a second format that is different from the first format, and
      translating the result data from the first format to the second format; and
   in response to obtaining the result data, executing a second step in the first plurality of steps in the first course of action based on the result data in the second format to respond to the incident occurring in the IT environment.

2. The method of claim 1, wherein the result data comprises addressing data for the incident in the IT environment.

3. The method of claim 1, wherein the result data comprises geographic location information.

4. The method of claim 1, wherein the second step comprises a step to compare the result data with one or more criteria.

5. The method of claim 1, wherein the second step comprises a step to compare the result data with a threshold.

6. The method of claim 1:
   wherein the first course of action includes a plurality of operations each corresponding to a different data format;
   wherein translating the result data from the first format to the second format includes executing an operation of the plurality of operations associated with the first format.

7. The method of claim 1 further comprising:
   receiving, via the graphical user interface, input defining the second course of action; and
   storing data defining the second course of action in the course of action database.

8. The method of claim 1 further comprising:
   in response to identifying the particular step, pausing execution of the first course of action; and
   in response to obtaining the result data, resuming execution of the first course of action.

9. A computing apparatus comprising:
   one or more non-transitory computer readable storage media;
   a processing system operatively coupled to the one or more non-transitory computer readable storage media; and
   program instructions stored on the one or more non-transitory computer readable storage media that, when executed by the processing system, direct the processing system to:
      receive, via a graphical user interface provided by an incident service, input defining a first course of action, wherein the first course of action includes a first plurality of steps to respond to incidents occurring in information technology (IT) environments, wherein the input defines a graphical diagram indicative of sequencing for the first plurality of steps, wherein a particular step of the first plurality of steps in the graphical diagram represents a call to a second course of action, and wherein the second course of action includes a second plurality of steps to obtain, from an external service, supplemental information about incidents occurring in IT environments;

store data defining the first course of action in a course of action database managed by the incident service, wherein the course of action database stores data defining a plurality of courses of action including the first course of action and the second course of action;

initiate execution of the first course of action, wherein the first course of action is executed to respond to an incident occurring in an IT environment, and wherein the first course of action involves modifying a configuration of a component of the IT environment;

during the execution of the first course of action:
identify the particular step in the first plurality of steps representing the call to the second course of action,
obtain the data defining the second course of action from the course of action database managed by the incident service,
initiate execution of the second course of action,
obtain result data from the execution of the second course of action,
identify a first format of the result data,
determine that a second step in the first plurality of steps uses as input result data in a second format that is different from the first format, and
translate the result data from the first format to the second format; and
in response to obtaining the result data, execute a second step in the first plurality of steps in the first course of action based on the result data in the second format to respond to the incident occurring in the IT environment.

10. The computing apparatus of claim 9, wherein the program instructions further direct the processing system to:
receive, via the graphical user interface, input defining the second course of action; and
store data defining the second course of action in the course of action database.

11. The computing apparatus of claim 9, wherein the program instructions further direct the processing system to:
in response to identifying the particular step, pause execution of the first course of action; and
in response to obtaining the result data, resume execution of the first course of action.

12. The computing apparatus of claim 9, wherein the second step comprises a step to compare result data with one or more criteria.

13. The computing apparatus of claim 9, wherein the second step comprises a step to compare result data with a threshold.

14. A non-transitory computer readable storage media comprising:

program instructions that, when executed by a processing system, direct the processing system to:
receive, via a graphical user interface provided by an incident service, input defining a first course of action, wherein the first course of action includes a first plurality of steps to respond to incidents occurring in information technology (IT) environments, wherein the input defines a graphical diagram indicative of sequencing for the first plurality of steps, wherein a particular step of the first plurality of steps in the graphical diagram represents a call to a second course of action, and wherein the second course of action includes a second plurality of steps to obtain, from an external service, supplemental information about incidents occurring in IT environments;
store data defining the first course of action in a course of action database managed by the incident service, wherein the course of action database stores data defining a plurality of courses of action including the first course of action and the second course of action;
initiate execution of the first course of action, wherein the first course of action is executed to respond to an incident occurring in an IT environment, and wherein the first course of action involves modifying a configuration of a component of the IT environment;
during the execution of the first course of action:
identify the particular step in the first plurality of steps representing the call to the second course of action,
obtain the data defining the second course of action from the course of action database managed by the incident service,
initiate execution of the second course of action,
obtain result data from the execution of the second course of action,
identify a first format of the result data,
determine that a second step in the first plurality of steps uses as input result data in a second format that is different from the first format, and
translate the result data from the first format to the second format; and
in response to obtaining the result data, execute a second step in the first plurality of steps in the first course of action based on the result data in the second format to respond to the incident occurring in the IT environment.

15. The non-transitory computer readable storage media of claim 14, wherein the program instructions further direct the processing system to:
receive, via the graphical user interface, input defining a second course of action; and
store data defining the second course of action in the course of action database.

16. The non-transitory computer readable storage media of claim 14, wherein the second step comprises a step to compare result data with one or more criteria.

17. The non-transitory computer readable storage media of claim 14, wherein the second step comprises a step to compare result data with a threshold.

* * * * *